(12) United States Patent
Sewell et al.

(10) Patent No.: US 9,739,034 B2
(45) Date of Patent: Aug. 22, 2017

(54) VEHICLE WITH NON-SYMMETRICAL DRIVE MEMBERS

(71) Applicant: The Charles Machine Works, Inc., Perry, OK (US)

(72) Inventors: Cody L. Sewell, Perry, OK (US); Brant Douglas Kukuk, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 254 days.

(21) Appl. No.: 14/458,002

(22) Filed: Aug. 12, 2014

(65) Prior Publication Data

US 2015/0040442 A1    Feb. 12, 2015

Related U.S. Application Data

(60) Provisional application No. 61/864,740, filed on Aug. 12, 2013.

(51) Int. Cl.
| | | |
|---|---|---|
| *E02F 3/10* | (2006.01) | |
| *E02F 9/02* | (2006.01) | |
| *E02F 5/06* | (2006.01) | |
| *E02F 3/08* | (2006.01) | |
| *E02F 3/16* | (2006.01) | |
| *E02F 5/14* | (2006.01) | |
| *B62D 11/00* | (2006.01) | |

(52) U.S. Cl.
CPC .............. *E02F 9/02* (2013.01); *B62D 11/001* (2013.01); *E02F 3/083* (2013.01); *E02F 3/088* (2013.01); *E02F 3/16* (2013.01); *E02F 5/06* (2013.01); *E02F 5/145* (2013.01)

(58) Field of Classification Search
CPC ....... A01B 33/028; A01B 33/16; A01B 51/02; A01B 79/02; B62D 55/075; B62D 55/14; B62D 55/12; B62D 55/10; B62D 55/06; B62D 55/286; B62D 11/001; E02F 5/14; E02F 5/06; E02F 3/10; E02F 3/083; E02F 3/146; E02F 3/145; E02F 9/02; E02F 5/145; E02F 3/088; E02F 3/16
USPC ...... 37/142.5, 352, 355, 357, 366, 367, 462, 37/465; 172/40, 42, 107; 180/8.1, 9.1, 180/9.32, 9.62, 19.1, 19.2, 19.3, 9.26, 180/9.48, 9.58; 280/5.22, 5.28; 305/142
See application file for complete search history.

(56) References Cited

U.S. PATENT DOCUMENTS

| | | | | |
|---|---|---|---|---|
| 5,228,221 A * | 7/1993 | Hillard | .................... | E02F 3/083 37/355 |
| 5,435,405 A * | 7/1995 | Schempf et al. | ......... | B08B 9/08 180/9.1 |
| 6,263,989 B1 * | 7/2001 | Won | ........................ | B25J 5/005 180/8.7 |
| 6,338,209 B1 * | 1/2002 | McClure | .............. | A01B 33/028 172/329 |

(Continued)

*Primary Examiner* — Robert Pezzuto
(74) *Attorney, Agent, or Firm* — Tomlinson McKinstry, P.C.

(57) ABSTRACT

A vehicle having a long track or wheel-trail wheel combination on one side and a smaller ground engaging member, such as a short track or wheel on the other. The vehicle has a work attachment on one end of its frame, which is provided clearance on the side of the vehicle with the short track or wheel. A control system is provided to allow an operator to properly control a direction of the vehicle despite the fact that different forces may be required to operate the long track and the short track or wheel.

24 Claims, 4 Drawing Sheets

(56) References Cited

U.S. PATENT DOCUMENTS

| | | | | |
|---|---|---|---|---|
| 7,348,747 B1* | 3/2008 | Theobold et al. | ....... | B25J 5/005 318/568.11 |
| 7,600,592 B2* | 10/2009 | Goldenberg et al. | | B62D 55/075 180/8.1 |
| 7,644,524 B2 | 1/2010 | Azure et al. | | |
| 7,753,155 B2* | 7/2010 | Snyder et al. | ....... | B62D 55/065 180/190 |
| 8,100,205 B2* | 1/2012 | Gettings et al. | ..... | B62D 55/075 180/9.1 |
| 8,113,306 B2* | 2/2012 | Mass et al. | .......... | A01B 33/028 180/19.1 |
| 8,256,542 B2 | 9/2012 | Couture et al. | | |
| 8,430,188 B2* | 4/2013 | Hansen | ................. | B62D 55/04 180/9.26 |
| 8,875,815 B2* | 11/2014 | Terrien et al. | ........... | B25J 5/005 180/65.1 |
| 9,248,875 B2 | 2/2016 | Wolf et al. | | |

\* cited by examiner

VEHICLE WITH NON-SYMMETRICAL DRIVE MEMBERS

CROSS REFERENCE TO RELATED APPLICATION

This application claims the benefit of provisional patent application Ser. No. 61/864,740, filed on Aug. 12, 2013, the entire contents of which are incorporated herein by reference.

FIELD

The present invention relates generally to the field of skid-steer work vehicles, such as trenchers or vibratory plows.

SUMMARY

A vehicle comprising a frame, a trencher, an auger, a first ground engaging assembly and a second ground engaging assembly. The trencher is connected to the frame and has a rotatable digging chain. The auger defines an auger axis and is connected to the frame. The first ground engaging assembly movably supports the frame and defines a first surface contact area. The second ground engaging member movably supports the frame and defines a second surface contact area. The second surface contact area is smaller than the first surface contact area. The auger axis extends above the first surface contact area but does not extend above the second surface contact area.

DESCRIPTION

Figure 1:
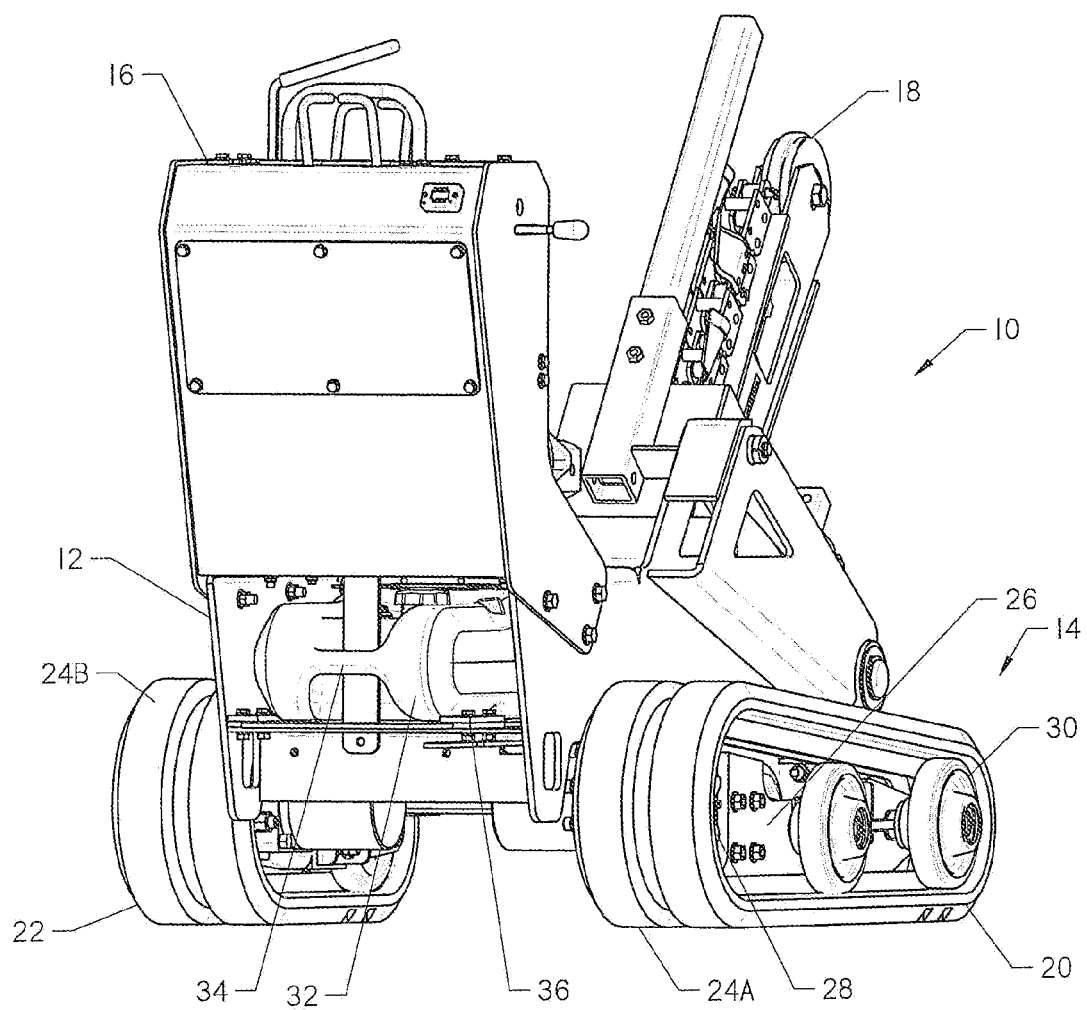
FIG. 1 is a right rear view of the tracked vehicle of the present invention.

With reference now to FIG. 1, shown therein is a vehicle 10 having a frame 12 and a motive force system 14. The frame 12 comprises an operator station 16 and a work attachment 18. The operator station 16 is configured for an operator walking behind the tracked vehicle 10. Ride-on platform and seated operator station 16 configurations are also contemplated. As shown, the work attachment 18 is a trenching boom, but alternative work attachments such as plows, buckets, excavators, microtrenching blades, and others are anticipated. The motive force system 14 comprises a first ground engaging assembly illustrated as a first track system 20 and a second ground engaging member, which is illustrated as a second track system 22. Each of the first track system 20 and the second track system 22 comprise an endless track 24 and a corresponding track support structure 26. The endless track 24 provides a surface-engaging area or contact area between a surface of the ground and the vehicle 10.

A first endless track 24A of the first track system 20 has a larger surface-engaging area between the ground and the endless track than a second endless track 24B of the second track system 22. The overall length of the first and second endless tracks 24A, 24B may differ, or they may be the same, but the contact surface is adjusted by the geometries of the first track system 20 and second track system 22. For example, the first track system 20 may provide for a "low track" while the second track system 22 provides a "high track" having a triangular profile. Alternatively, the first and second track systems 20, 22 may have similar geometries but different lengths, as shown in FIG. 1. The second track system 22 may comprise a surface-engaging area that is 75% or less than the surface-engaging area of the first track system 20. Additionally, the invention could be utilized where the second ground engaging member comprises one or more wheels (not shown) used in place of the second endless track 24B. The endless tracks 24A, 24B may be adjustable to tension the endless tracks about their corresponding track support structure 26.

The track support structure 26 of each track system 20, 22 comprises a drive sprocket 28 and a bogey wheel 30. The drive sprocket 28 is powered by a motor (not shown) to drive the endless track 24A, 24B. The drive sprocket 28 of each track system 20, 22 may be powered by a separate motor. The bogey wheels 30 provide support and shape for the endless track 24A, 24B as it is driven by the sprocket 28.

The vehicle 10 further comprises a fuel tank 32 for storing fuel such as gasoline, diesel, and other liquid fuels for operation of the vehicle and its components. The fuel tank 32 comprises a handle 34 for removal of the fuel tank and storage at a location away from the vehicle 10. A fuel tank tray 36 allows the fuel tank to be removed from the frame 12 for refueling purposes.

Figure 2:
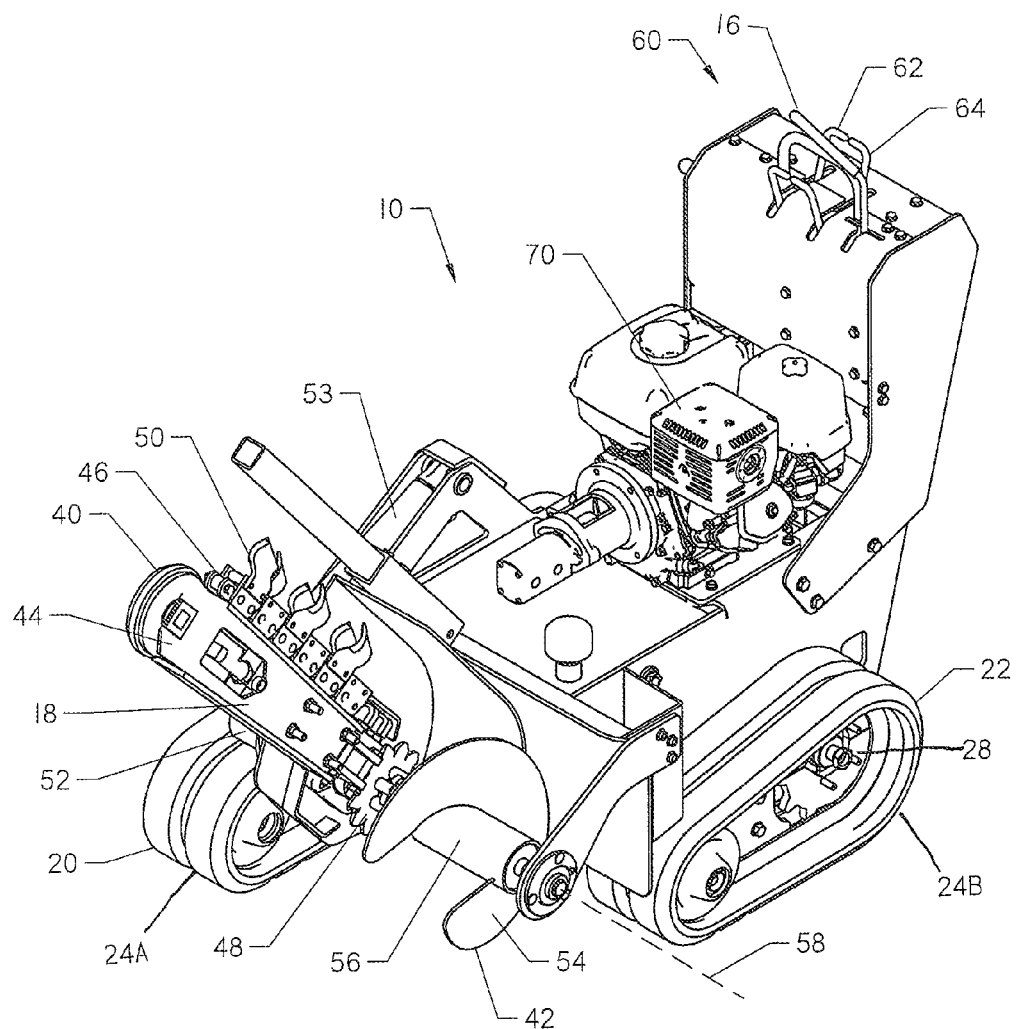
FIG. 2 is a left-front perspective view of the tracked vehicle of FIG. 1.

With reference now to FIG. 2, the vehicle 10 is shown from the side of the second track system 22. The work attachment 18 shown comprises a trencher 40 and auger 42. The trencher 40 comprises a boom 44, an endless digging chain 46, and a sprocket 48. The digging chain 46 comprises a plurality of teeth 50 for digging a trench when the chain is rotated. The sprocket 48 is powered by a motor 52 and causes the digging chain 46 to rotate about the boom 44. A cylinder 53 is hydraulically powered and controlled at the operator station, and causes the trencher boom 44 to pivot such that the digging chain 46 can engage the ground and create a trench.

The auger 42 is either independently powered or powered by the same motor 52 as the sprocket 48. As shown, the auger 42 comprises a blade 54 and a shaft 56 having an auger axis 58. The blade 54 is attached to the shaft 56 such that rotation of the shaft 56 about the auger axis 58 causes the blade to move spoils from proximate the trencher 40 away from the vehicle 10. The trencher boom 44 may pivot about the auger axis 58 due to operation of the hydraulic cylinder 53. Alternatively, the trencher boom 44 may pivot at a different location. The auger axis 58, when extended in both directions to infinity, will extend above a surface contact area of the first track system 20, but will not extend above a surface contact area of the second track system 22, allowing the auger 42 to remove spoils from proximate a trench created by the trencher 40 but outside of the profile of the vehicle 10.

As shown in FIG. 2, the auger axis 58 and the sprocket 48 are in front of the second endless track 24B but not in front of the first endless track 24A. As the second track structure 22 shown is a "low track" system, the sprocket 28 is located proximate the back of the vehicle 10. One of ordinary skill will appreciate that this sprocket 28 may be placed at any point with a long contact profile with the endless track 24B, and that a "high track" system may have a sprocket at an apex of a triangular profile (not shown).

Controls 60 are provided at the operator station 16 for controlling the track systems 20, 22 and work attachment 18 of the vehicle 10. As shown, the controls 60 comprise a first track throttle 62 and a second track throttle 64. The first track throttle 62 controls the first track system 20, while the second track throttle 64 controls the speed of the second track system 22. One of skill in the art will appreciate that for track systems 20, 22 of differing lengths to operate at the same speed, a hydraulic control system, gear differential, hydrostatic motors, an electric control system or other means for controlling the throttle (not shown) may be utilized for ease of control of the motive force system 14. For example, when the first track throttle 62 and second track throttle 64 are fully open, the endless tracks 24A, 24B should provide the same motive forces, even if the power required to achieve the force is different for each track.

Alternatively, the controls 60 may comprise a multi-axis joystick (not shown) for controlling the first track system 20 and second track system 22. The multi-axis joystick directs the motive force system 14 to cause the vehicle 10 to move in forward, reverse, or turn based on the two-dimensional actuation of the joystick.

All of the components of the vehicle 10 may be powered by one engine 70 mounted on the frame; however, separate motors may be utilized for each of the work attachment 18, first track system 20 and second track system 22.

Figure 3:
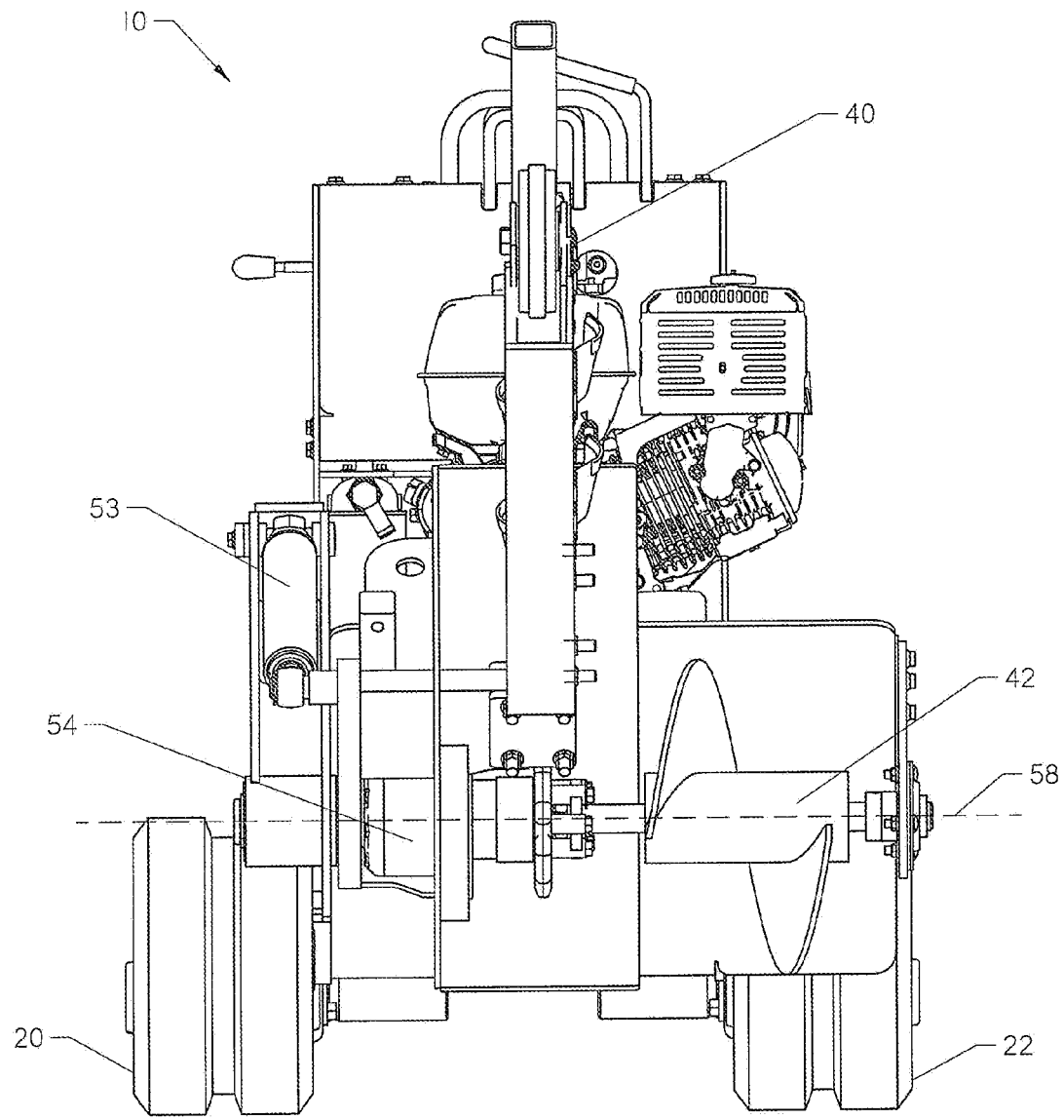
FIG. 3 is a front view of the tracked vehicle of FIG. 1 with the trencher digging chain removed.

With reference now to FIG. 3, the vehicle 10 of FIG. 2 is shown from the front with the digging chain 46 removed so that the auger 42 is clearly shown in front of the second track system 22.

Figure 4:
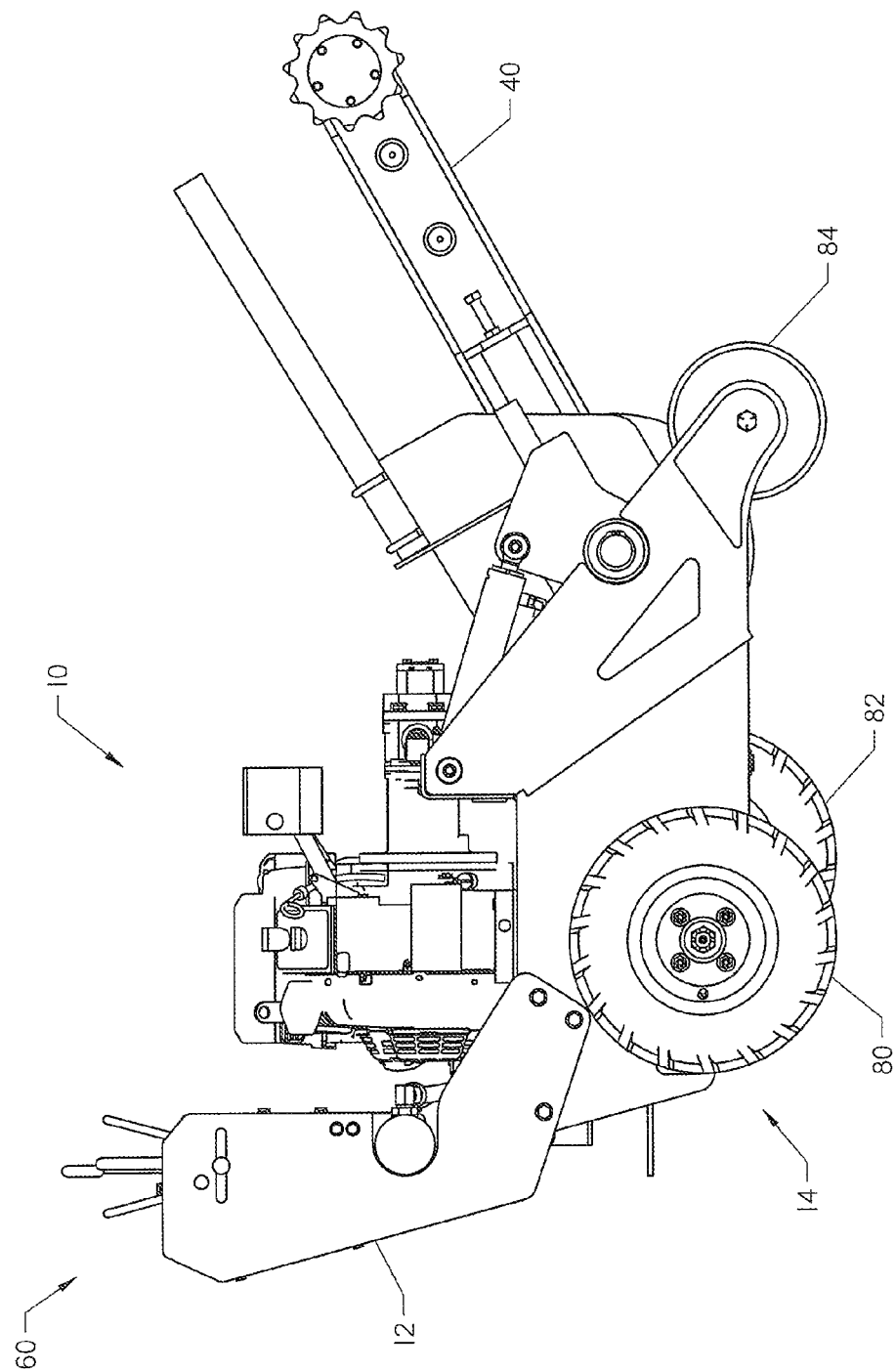
FIG. 4 is a side view of a wheeled vehicle in accordance with the present invention.

With reference to FIG. 4, a wheeled embodiment of the vehicle 10 is shown therein. The motive force system 14 comprises a first drive wheel 80, a second drive wheel 82, and a roller wheel 84. The first and second drive wheels 82 provide motive force to the vehicle 10. As shown, the first and second drive wheels 80, 82 are the same size and offset relative to the frame 12. Alternatively, the first and second drive wheels 80, 82 may be of differing sizes. The roller wheel 84 is disposed on the same side of the frame as the first drive wheel 80 and provides stability but no motive force. One of ordinary skill can appreciate that an additional drive wheel could be used in place of roller wheel 84. As with respect to the first and second track systems 20, 22 described above, the drive wheels 80, 82 may be powered by separate motors.

Together, first drive wheel 80 and roller wheel 84 form a first ground engaging assembly with a surface contact area greater than the surface contact area of the second drive wheel 82. The auger axis 58 (FIG. 2), when extended in both directions to infinity, will extend above a surface contact area defined by the region where the first ground engaging assembly (the first drive wheel 80 and roller wheel 84) contacts the ground, but will not extend above a surface contact area of the second drive wheel 82, allowing the auger 42 to remove spoils from proximate a trench created by the trencher 40 but outside of the profile of the vehicle 10.

Various modifications can be made in the design and operation of the present invention without departing from the spirit thereof. For example, the first drive wheel 80 and roller wheel 84 of FIG. 4 may be used with the second track system 22 of FIG. 2. Thus, while the principle preferred construction and modes of operation of the invention have been explained in what is now considered to represent its best embodiments, which have been illustrated and described, it should be understood that the invention may be practiced otherwise than as specifically illustrated and described.

What is claimed is:

1. A vehicle comprising:
a plurality of endless track assemblies;
a frame having opposed forward and rear ends and laterally spaced first and second sides, the frame being moveably supported on a surface of the ground by the plurality of endless track assemblies;
wherein one and only one of the plurality of endless track assemblies is disposed on the first side and one and only one of the plurality of endless track assemblies is disposed on the second side such that the first and second endless track assemblies define fixed footprints of unequal area.

2. The vehicle of claim 1 wherein the footprint of one of the plurality of endless track assemblies is less than 75% of the footprint of another of the plurality of endless track assemblies.

3. The vehicle of claim 1 wherein one of the plurality of endless track assemblies is triangularly shaped.

4. The vehicle of claim 1 further comprising a trencher and an auger connected to a forward end of the frame.

5. The vehicle of claim 4 wherein the trencher and the auger are powered by one and only one motor.

6. The vehicle of claim 4 wherein the auger defines an auger axis wherein the auger axis is situated closer to the forward end of the frame than a leading end of the first of the plurality of endless track assemblies but is situated further from the forward end of the frame than a leading end of the second of the plurality of endless track assemblies.

7. The vehicle of claim 1 further comprising a control system, the control system comprising a first throttle for controlling the first of the plurality of endless track assemblies and a second throttle for controlling the second of the plurality of endless track assemblies.

8. The vehicle of claim 7 wherein the control system allows the vehicle to move in a straight line when a setting of the first throttle is equal to a setting of the second throttle.

9. The vehicle of claim 1 further comprising a work attachment attached to the frame, wherein the first of the plurality of endless track assemblies extends forward of a point where the work attachment attaches to the frame.

10. The vehicle of claim 9 wherein the work attachment comprises a trencher, plow, excavator or bucket.

11. The vehicle of claim 1 wherein the first ground engaging assembly is located at a first side of the frame and the second ground engaging assembly is located at a second side of the frame, such that the frame is supported entirely between the first ground engaging assembly and the second ground engaging assembly.

12. The vehicle of claim 1 wherein each endless track assembly is motor-powered.

13. A vehicle comprising:
a frame comprising a forward and a rearward end;
a trencher connected to the forward end of the frame having a rotatable digging chain;
an auger defining an auger axis and connected to the frame;
a first endless track assembly movably supporting the frame and defining a first surface contact area;
a second endless track assembly movably supporting the frame and defining a second surface contact area, wherein the second surface contact area is smaller than the first surface contact area; and
wherein the auger axis extends forward of the first surface contact area but does not extend forward of the second surface contact area.

14. The vehicle of claim 13 wherein the auger and trencher are powered by a single motor.

15. The vehicle of claim 13 further comprising a first throttle and a second throttle, wherein the first throttle controls the first endless track assembly and the second throttle controls the second endless track assembly.

16. The vehicle of claim 15 wherein the vehicle travels in a straight line when a setting of the first throttle is equal to a setting of the second throttle.

17. The vehicle of claim 13 further comprising a multi-axis joystick for controlling the direction of the vehicle.

18. The vehicle of claim 13 wherein the first endless track assembly comprises one and only one track and the second endless track assembly comprises one and only one track.

19. The vehicle of claim 13 wherein no track assembly on any side overlays another track assembly.

20. A vehicle comprising:
   a frame having opposed forward and rear ends and laterally spaced first and second sides; and
   two and only two powered ground-engaging members supporting the frame and comprising:
      a first ground engaging member supporting the frame at its first side and having a first forward edge of ground contact adjacent the forward end of the frame; and
      a second ground engaging member supporting the frame at its second side and having a second forward edge of ground contact offset rearwardly from the first forward edge of ground contact.

21. The vehicle of claim 20 further comprising a trencher supported at the forward end of the frame.

22. The vehicle of claim 20 further comprising an auger supported at the forward end of the frame, the auger having a discharge end positioned forwardly of the second forward edge of ground contact.

23. The vehicle of claim 20 in which the ground engaging members are both tracks or are both wheels.

24. The vehicle of claim 20 wherein the first forward edge and the second forward edge are fixed in position relative to the frame.

* * * * *

UNITED STATES PATENT AND TRADEMARK OFFICE
CERTIFICATE OF CORRECTION

PATENT NO. : 9,739,034 B2  
APPLICATION NO. : 14/458002  
DATED : August 22, 2017  
INVENTOR(S) : Sewell et al.

It is certified that error appears in the above-identified patent and that said Letters Patent is hereby corrected as shown below:

In the Claims

Column 5, Line 21, after "and", please insert --defining fixed footprints of unequal area--.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*